(12) United States Patent
Guthaus

(10) Patent No.: US 8,739,100 B2
(45) Date of Patent: May 27, 2014

(54) DISTRIBUTED LC RESONANT TANKS CLOCK TREE SYNTHESIS

(75) Inventor: Matthew Guthaus, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 49 days.

(21) Appl. No.: 13/531,528

(22) Filed: Jun. 23, 2012

(65) Prior Publication Data

US 2013/0162344 A1    Jun. 27, 2013

Related U.S. Application Data

(60) Provisional application No. 61/502,619, filed on Jun. 29, 2011.

(51) Int. Cl.
*G06F 17/50* (2006.01)

(52) U.S. Cl.
USPC ............ 716/114; 716/110; 716/111; 716/112; 716/113; 716/118; 716/119; 716/122; 716/126; 716/130; 716/132; 716/134

(58) Field of Classification Search
CPC ............ G06F 17/5068; G06F 17/5081; G06F 17/5072; G06F 17/5077; H03K 19/17736
USPC ......... 716/110–114, 118–119, 122, 126, 130, 716/132, 134
See application file for complete search history.

(56) References Cited

U.S. PATENT DOCUMENTS

| 4,080,720 | A  | * | 3/1978  | Balyoz et al. ................. 438/129 |
| 7,015,765 | B2 | * | 3/2006  | Shepard et al. ........... 331/117 D |
| 7,145,408 | B2 | * | 12/2006 | Shepard et al. ........... 331/117 D |
| 7,237,217 | B2 | * | 6/2007  | Restle ........................... 327/291 |
| 2013/0049840 | A1 | * | 2/2013 | Van Goor et al. ............ 327/307 |
| 2013/0154727 | A1 | * | 6/2013 | Guthaus ....................... 327/565 |

OTHER PUBLICATIONS

Rahimian, S., et al., "Design of resonant clock distribution networks for 3-D integrated circuits", 2011, Springer-Verlag Berlin Heidelberg, PATMOS 2011, LNCS 6951, pp. 267-277.*

* cited by examiner

*Primary Examiner* — Stacy Whitmore
(74) *Attorney, Agent, or Firm* — Adam Warwick Bell; Matthew R. Kaser

(57) ABSTRACT

A technique for implementing an clock tree distribution network having a clock buffer and a plurality of LC tanks that each take into consideration local capacitance distributions and conductor resistances. An AC-based sizing formulation is applied to the buffer and to the LC tanks so as to reduce the total buffer area. The technique is iterative and can be fully automated while also reducing clock distribution power consumption.

10 Claims, 2 Drawing Sheets

DISTRIBUTED LC RESONANT TANKS CLOCK TREE SYNTHESIS

RELATIONSHIP TO OTHER APPLICATIONS

To the extent allowed by law this application claims priority to and the benefit of U.S. provisional application No. 61/502,619 entitled "DISTRIBUTED LC RESONANT TANKS CLOCK TREE SYNTHESIS," filed on Jun. 29, 2011, having inventor Dr. Matthew Guthaus. That application is hereby incorporated by reference to the fullest extent allowed by law.

FIELD OF THE INVENTION

The presently disclosed subject matter is directed towards tree clock distribution networks that use resonant clocks with asymmetric clock loads and that take into consideration local capacitances and that enable reduced power consumption.

BACKGROUND OF THE INVENTION

The on-going demand for high performance electronic systems has driven the need for high-speed digital Very Large Scale Integration (VLSI) chips. VLSI implementations have proceeded along two inter-related directions: higher performance and higher density (more devices per unit area). While modern VLSI chips have achieved astonishingly high levels of performance and chip density there is a very strong demand for even higher levels.

One serious impediment to achieving what is demanded is power consumption. As a rule of thumb higher performance requires more power. But, more power produces more heat, which increases failure rates. Consequently, power consumption is the predominant challenge in improving modern high performance VLSI chips and systems.

Almost all modern VLSI designs are clocked. That is, the operations of the gates within a VLSI device are synchronized to act together by clock signals. So long as the gates can keep up, the higher the clock rate the faster the performance. Unfortunately, as clock rates and VLSI chip densities increase it becomes very difficult to ensure that all of the chips can keep up with the clocks. One reason for this is that each device in a VLSI chip needs its own clock signal, but not all sequential elements are the same distance from the clock signal source, which means that all clock lines are the not the same length. Different lengths coupled with unavoidable signal delays caused by distributed inductances and capacitances mean that clock signals arrive at different devices at different times (clock skew). Such can effectively limit the performance of a VLSI chip.

Compounding clocking problems is the fact that clocking requires power. In fact, the on-chip clock distribution network (CDN) of modern VLSI chips often consumes more than 35% of the total chip power and can occasionally require as much as 70%.

Various approaches have been used in the prior art to address the clocking problems. One approach to decreasing CDN power consumption is to use resonant clocks in the clock distribution network. FIG. 1 illustrates a resonant clock 10. Ideally, by oscillating clock energy between the electric field of capacitance Cs 12 and the magnetic field of inductor Ls 14 the clock energy is recycled and power consumption is decreased (ideally to zero). The resonant frequency of the tank circuit is ideally:

$$f = 1/2\pi\sqrt{L_s C_s}$$

However, to provide the required CMOS logic levels of zero and $V_{dd}$ 16a positive bias is obtained by adding a decoupling capacitor $C_d$ 18 on the grounded end of the paralleled inductor Ls 14 as shown in FIG. 1. That additional capacitance $C_d$ 18 creates a parasitic series LC tank circuit. Careful sizing of $C_d$ 18 is required to ensure that the series resonant frequency is well separated from the parallel resonant frequency, i.e.:

$$1/2\pi\sqrt{L_s C_d} \ll 1/2\pi\sqrt{L_s C_s}$$

In practice, pure series/parallel LC tanks are not seen because of unavoidable wire resistances, specifically: $R_{wl}$ 20, the conductor resistance between the clock driver and the inductor, $R_{wr}$ 22 the conductor resistance between the inductor 14 and the clock capacitor Cs 12 the driving element resistance $R_{dir}$ 24 and the parasitic resistance of the inductor $R_s$ 26

Those unavoidable wire resistances shift the resonance frequency of the parallel LC oscillator downward and change that oscillator's Q. Furthermore, the placement of an LC tank in the tree determines the attenuation. Different placements mean different attenuation. Consequently, where the LC tanks are placed in a clock distribution network is of utmost concern.

While very promising in theory, resonant clocks 10 are usually restricted to VLSI H-tree clock distribution networks 28 that use H-trees. Referring now to FIGS. 2a and 2b, an H-tree 30 is a conductor topology for minimizing clock skew by making interconnections to VLSI circuit "subunits" equal in length by using a regular pattern of clock line conductors 34. An H-tree 30 is a symmetric tree structure and has been used in the top-level tree topology to drive clock grids in high performance IC designs.

In the prior art are several techniques of using resonate H-trees 30 to drive clock grids and to obtain the correct LC placement and sizing. When H-tree clock distribution networks 28 incorporate resonant tanks the LC tanks are inserted at points in the H-tree clock distribution networks 28 so as to resonate each subunit clock sector. Refer to FIG. 2b for a depiction of a resonant H-tree grid 38 augmented by distributed LC tanks. While an H-tree 30 can have many different levels, in the prior art the LC tanks were always placed at the input of the second level in a 2-level H-tree network.

While conceptually interesting, H-trees 30 in general and H-tree clock distribution networks 28 in particular are seldom if ever used. A major problem is that H-trees 30 require an even (balanced) distribution of gates, terminals, loads, distributed capacitance and inductances and conductors. Such limitations are neither practical nor realistic in actual VLSI H-tree clock distribution network 28 designs.

One issue not well-addressed in the prior art is the uneven loading of clock distributions. The distribution of sink loads significantly alters resonant behavior and prevents correct functionality of LC tanks. Resonant trees present several unique challenges to automated designs compared to buffered trees. First, the parasitic resistances and inductances in a clock distribution alter the resonant frequency. Second, the resistances add attenuation at high frequencies. No successful prior art methods to address those problems have been proposed.

Therefore, a system and method that addresses and allows uneven loading of clock tree distributions would be beneficial. Even more useful would be a system and method that addresses uneven loading of the clock tree distributions while also enabling an increase in power efficiency. Ideally, the method would be suitable for automatic implementation at the design level.

BRIEF SUMMARY OF THE INVENTION

The principles of the present invention provide for techniques that address uneven and non-uniform loading of clock tree distributions while enabling a significant increase in power efficiency. Those principles can be automatically implemented at the design level.

Those principles are incorporated in systems and methods for placing and sizing LC tanks in an unbalanced clock tree distribution networks while taking into consideration local capacitance distributions and conductor resistances. The principles of the present invention enable the locating, placing, and sizing procedures to be fully automated in the design stages of VLSI devices while also enabling extremely significant power savings.

The principles of the present invention are implemented in a computerized process of semiconductor device fabrication. Specification data is input to the computerized system and then circuit design and analysis is performed to implement the placing and sizing of LC tanks. Circuit simulation is then performed and if the designed placement and sizing of the LC tanks does not meet the specification data a feedback loop is entered where modifications are implemented. Once the circuit design meets the specification data the computerized system fabricates a wafer mask. That mask is then used to fabricate a wafer having numerous individual devices. Those devices are the cut from the wafer and packaged as integrated circuits implemented by and in accord with the present invention.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

Figure 1:
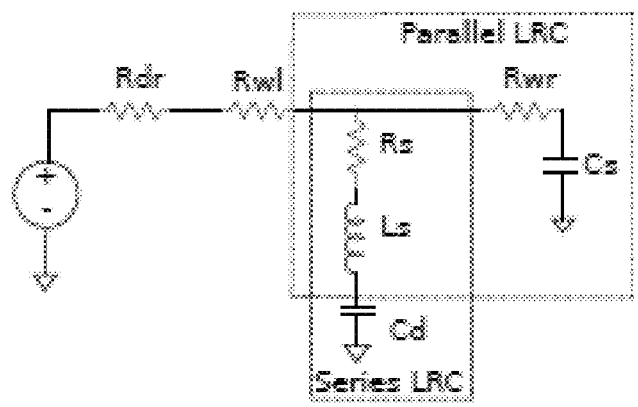
FIG. 1 is a depiction of a prior art LC tank network 10.
Figure 2:
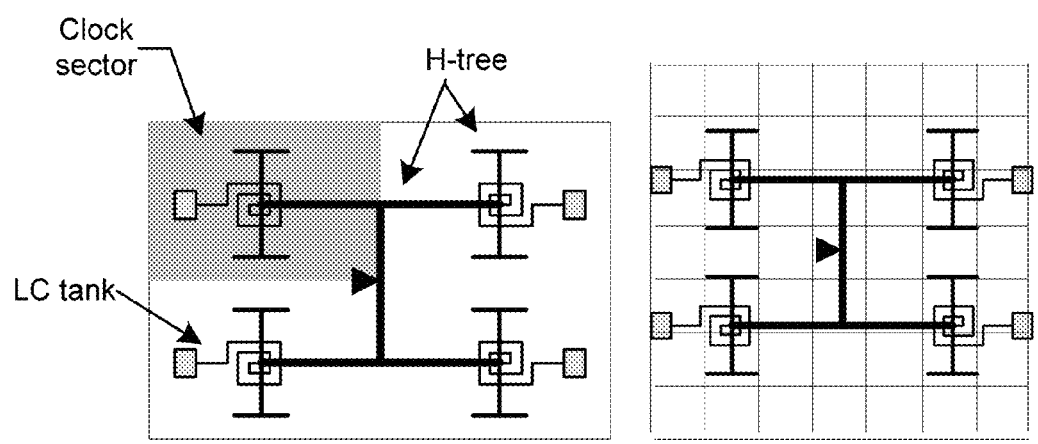
FIG. 2 is a schematic representation of a prior art H-tree system.

The presently disclosed subject matter now will be described more fully hereinafter with reference to the accompanying drawings in which an embodiment is shown. However, it should be understood that this invention may take many different forms and thus should not be construed as being limited to the embodiment set forth herein. In the figures like numbers refer to like elements throughout.

All publications mentioned herein are incorporated by reference for all purposes to the extent allowable by law. In addition, in the figures like numbers refer to like elements throughout. Additionally, the terms "a" and "an" as used herein do not denote a limitation of quantity, but rather denote the presence of at least one of the referenced items.

The present invention relates to placing and sizing LC tanks in a clock tree distribution networks in a manner that addresses uneven loading of the tree while also enabling a significant increase in power efficiency. As such, the present invention greatly enhances the usefulness of resonant clock trees by enabling more useful and practical design topologies, enabling power savings, and automating design methodologies. Furthermore, the present invention can be used to improve devices such as notebook computers, handheld devices, and remote sensors.

The principles of the present invention incorporate method system and method of placing LC tanks in clock trees while taking into account conductor resistances, local capacitance distributions, and clock loads. The principles of the present invention fully automated design procedure rather than hand tuned as was attempted in the prior art, while also enabling extremely significant power savings (up to 80%).

There are many different possible clock distribution trees. The present invention is beneficially applied to either a zero skew or a bounded skew routed clock tree without internal buffers. To minimize transmission line reflections and wire attenuation the tree conductors are tapered. Furthermore, only the clock tree root is buffered, and it is buffered sufficiently to maintain resonant behavior with full voltage swings during operation.

Given the foregoing clock tree constraints, conductor, and buffer characteristics the principles of the present invention provide for a novel design Algorithm that enables systems and methods of designing clock tree distribution networks having asymmetric clock loads. The Algorithm assumes that LC tanks are inserted at assumed levels and at varying distances from the root driver, sizes the LC tanks at the assumed levels, and implements a design that ensures a suitable voltage swing. That Algorithm is best implemented in a CAD design stage that uses the novel Algorithm to produce clock tree lay-out designs implementable in semiconductor devices. As such it uses some existing methodologies that are generally available in VLSI CAD design packages while improving the prior results to enable fabrication of semiconductor devices and systems. The Algorithm accepts input criteria, processes such input criteria, and produces data acceptable to semiconductor layout systems for automatically producing improved clock trees.

The algorithm is:

```
1:   TaperWires( )
2:   while |H(jw)| < 0.9 do
3:     H_best ← 0, I_best ← 0
4:     for r=0 to MaxRadius do
5:       addLCLevel(r)
6:       sizeLCTTanks( )
7:       sizeDriver( )
8:       simulateAC( )
9:       if |H(jw)| > H_best then
10:        H_best ← |H(jw)|
11:        R_best ← r
12:      end if
13:      deleteLCLevel(r)
14:    end for
15:    addLCLevel(R_best)
16:    sizeLCTanks( )
17:  end while
```

Line 1 implements the tapered conductors used in the inventive system and method. Functions and procedures for implementing tapered conductors are available in the prior art but are new to this application. The outer loop beginning on line 2 of the algorithm iterates until the output voltage swing is within 0.9V. That is, the principles of the present invention are best implemented using an iterative procedure wherein if the result is not satisfactory another pass is made through the algorithm until a suitable result is obtained.

A given iteration of the algorithm between lines 4-14 searches over a set of discrete resistances from the root. At each iso-resistance radius, a level of LC tanks is added, see line 5, and all LC tanks are sized at that level, see line 6. The clock driver is sized, reference line 7, and then the circuit is simulated using AC analysis, reference line 8.

Lines 9-12 track the iso-resistance radius that best maximizes the output swing. Line 13 temporarily removes the current solution to try other radii. In lines 15-16, the best previously seen solution is kept and the outer loop is repeated until a sufficient signal swing is achieved.

Figure 3:
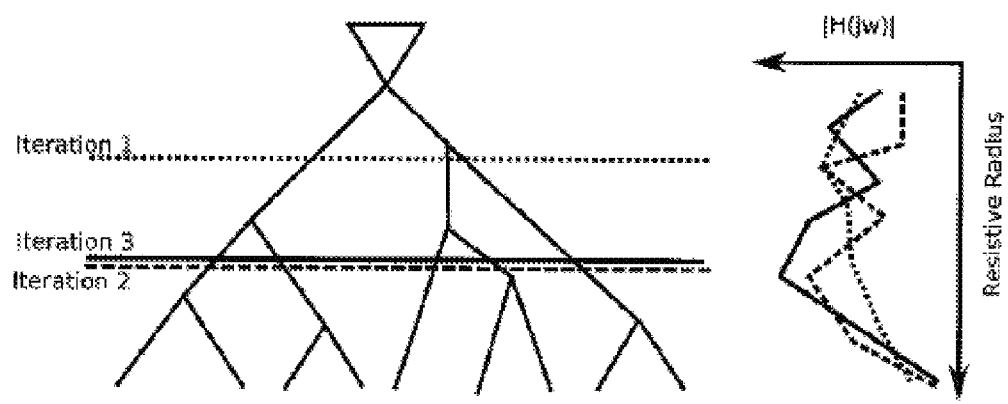
FIG. 3 is a schematic depiction of iterations through a tree to visualize locating LC networks in the tree.

FIG. 3 illustrates an example of the present invention using three iterations. During iteration 1 the tree is swept from input to output, and the radius that maximizes the output swing is kept. Subsequently, iteration 2 places another level of LC tanks lower in the H-tree which is more effective when performed in cooperation with the LC tanks in iteration 1. Ten evenly spaced discrete radii are usually sufficient for convergence.

Whenever LC tanks are placed at a given level, the inductors (Ls) and decoupling capacitors (Cd) of all LC tanks also must be sized. Given N number of LC tanks, the total capacitance is assumed to be equally divided among the LC tanks such that each LC tank resonates with a capacitance Cs=Ctree/N. Given this, the inductance Ls is found from:

$$L_s = 1/C_s(2\pi f_0)^2$$

and the decoupling capacitor is sized as:

$$C_d = 10 C_s.$$

For each iteration a gradient-based sizing of the clock drivers are performed. The clock driver resistance is first set to 25Ω and an AC analysis is then performed. If the output transfer function is greater than 0.9 at the target frequency the driver is downsized by 10%. If the output transfer function is less than 0.9 the driver is increased by 10%. The iterations are limited to 25 or to when the desired output voltage swing is within a 0.01V tolerance. Typically, convergence will be seen in a few iterations.

Figure 4:
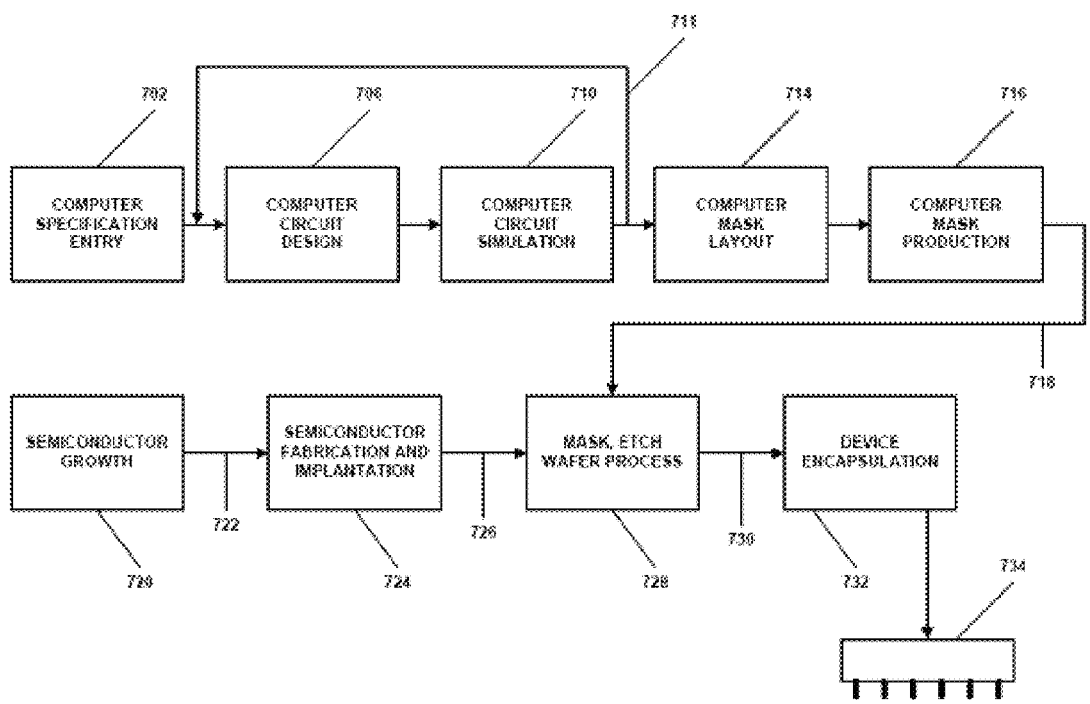
FIG. 4 illustrates the fabrication of an integrated circuit using the principles of the present invention.

The result of the techniques for placing and sizing LC tanks in an unbalanced clock tree distribution networks while taking into consideration local capacitance distributions and conductor resistances. By using the techniques an integrated circuit produced by and incorporating such LC resonant tank networks can be fabricated. FIG. 4 illustrates how the present invention can be used to implement an integrated circuit. There are three main processes that come into play. First entering device specifications, implementing a circuit design using the present invention, and then producing a wafer mask suitable for fabricating semiconductor devices. Second, growing a semiconductor ingot and processing it to a wafer ready for device fabrication. Finally fabricating an integrated circuit using the produced wafer mask and the wafer and then cutting the wafer to produce an IC chip which is encapsulated as an integrated circuit. Each individual function is complex, but except for incorporating the present invention to accomplish the required tasks, all are well known and have been used for many years.

The first set of fabrication actions begin with an operator entering specification data on an input terminal 702. Specification data is entered in the proper format to describe the performance of the desired integrated circuit. With the specifications fully entered a computer 706 implements a circuit design. During circuit design a computer 710 simulates the circuit being designed to ensure that it will meet the design specifications. The process of having a computer or computers design and simulate the circuit reiterates 711 until the circuit being designed fulfills the design specifications. The principles of the present invention relate to the circuit design process.

After the circuit has been designed a computer 714 performs a mask lay out. That is, the computer 714 accepts the final circuit design and converts that circuit design into a physical layout of an integrated circuit mask that will be used in later stages to produce the integrated circuit. After mask layout is complete a computer 716 controls the production of a mask, represented by line 718.

Meanwhile, the second set of production functions has been ongoing. First a semiconductor is grown in a semiconductor production facility 720 to produce a semiconductor ingot, represented by line 722. That ingot 722 is sent to a Semiconductor fabrication and implantation facility 724 where the ingot 722 is diced into wafers, polished, and ion implanted to produce a wafer 726. The wafer 726 is then fabricated to retain a plurality of individual integrated circuit devices using the mask 718. Thus the present invention is physically incorporated into integrated circuit devices. The wafer with its individual integrated circuit devices, represented by line 730, is then sent to a device encapsulation plant 732 where the wafer 730 is cut into individual integrated circuits 734 which are then encapsulated for subsequent use.

The end result of this complex process is an individual integrated circuit 734 that benefits from and that incorporates the principles of the present invention.

Therefore, it is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

What is claimed:

1. A non transitory computer readable media for designing VLSI devices, comprising computer readable instructions to accomplish:
    (a) laying out a bounded skew routed clock tree distribution conductor pattern for incorporation on a semiconductor die;
    (b) applying a buffered clock root driver to a top level of said tree so as to enable a clock voltage swing from 0 to $V_{dd}$;
    (c) searching over a set of discrete resistances from said clock root driver by adding and sizing a level of LC tanks to said tree, wherein each LC tank is sized at its location so as to produce a predetermined resonant frequency using the distributed capacitances and conductor resistances at each location; and
    (d) simulating each LC tank using AC analysis to verify said predetermined resonant frequency and a predetermined clock voltage swing at each location.

2. The non transitory computer readable media of claim 1, further including a step (e) of iterating through steps (c) to (d) until a predetermined clock voltage swing is verified in step (d).

3. The non transitory computer readable media of claim 2, further including a step (f) of attaching a DC bias capacitance to each LC tank.

4. The non transitory computer readable media of claim 2, wherein step (c) includes sizing each LC tank using a driver resistance of said buffered clock root driver.

5. The non transitory computer readable media of claim 1, wherein (b) produces tapered conductor lines.

6. A computer system for designing VLSI devices on a semiconductor die, comprising:

inputting into a computer specification data including a resonant frequency and a clock voltage swing;

computerized laying out of a bounded skew routed clock tree distribution conductor pattern comprised of tapered conductor lines;

identifying from design data a buffered clock root driver at a top level of the tree to enable a clock voltage swing from 0 to $V_{dd}$;

computerized searching over a set of discrete resistances by adding and sizing a level of LC tanks to the tree, wherein each LC tank is sized at its location to produce a predetermined resonant frequency using the distributed capacitances and conductor resistances at each location; and running a computer simulation on each LC tank using AC analysis to verify the input resonant frequency and input clock voltage swing at each location.

7. The computer system of claim 6, further including repeating searching over the set of discrete resistances by adding and sizing a level of LC tanks to the tree, and computer simulating each LC tank using AC analysis to verify the input resonant frequency and input clock voltage swing at each location until the clock voltage swing is verified.

8. The computer system of claim 7, further including designing a DC bias capacitance at each LC tank.

9. The computer system of claim 7, wherein computerized searching over a set of discrete resistances includes adding and sizing a level of LC tanks includes sizing each LC tank using a driver resistance of the buffered clock root driver.

10. The computer system of claim 6, wherein the clock tree distribution conductor patterns are designed having tapered conductor lines.

* * * * *